UNITED STATES PATENT OFFICE.

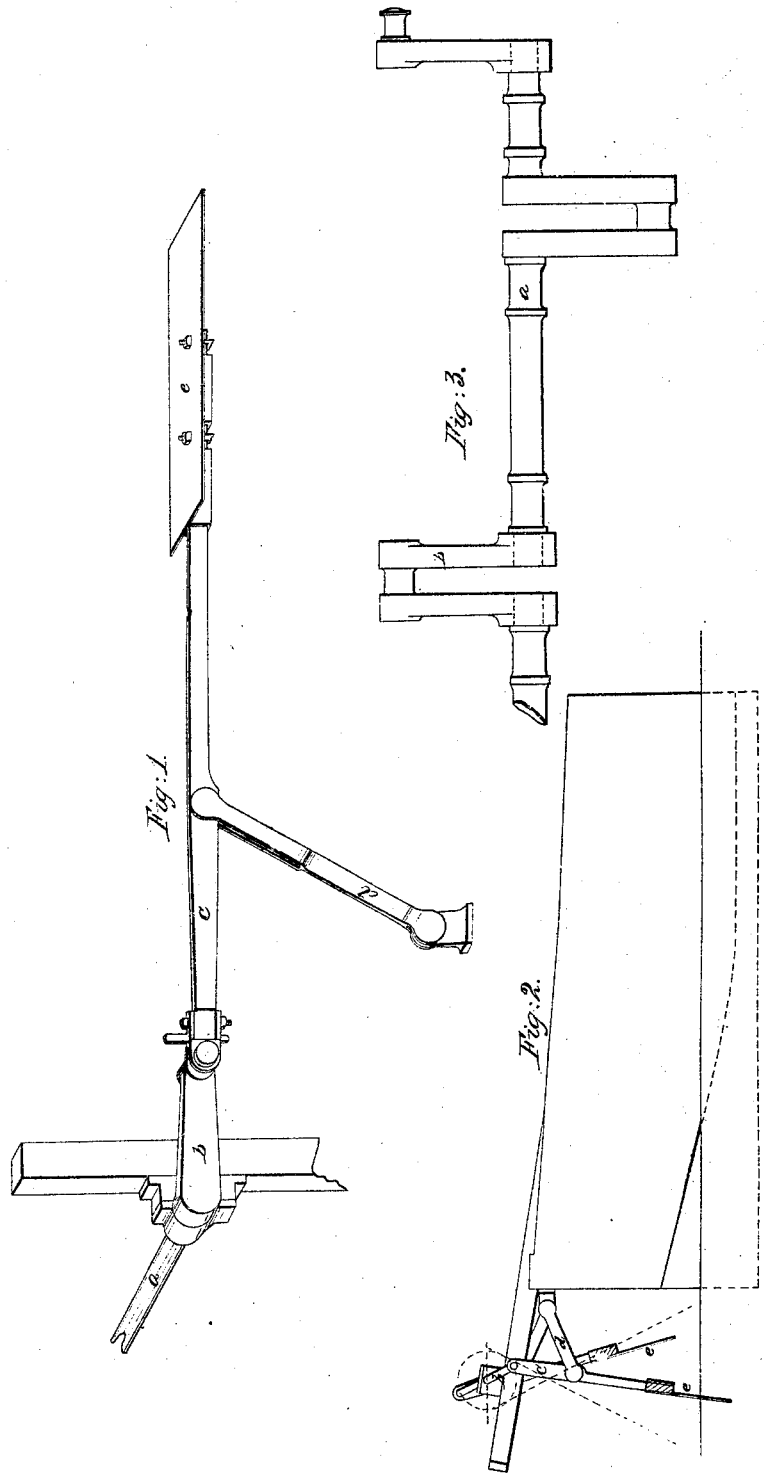

P. C. CLARK, OF READING, PENNSYLVANIA.

RECIPROCATING PADDLE.

Specification of Letters Patent No. 20,328, dated May 25, 1858.

*To all whom it may concern:*

Be it known that I, PETER C. CLARK, of Reading, in the county of Berks and State of Pennsylvania, have invented an Improvement in Propelling Canal-Boats; and I do hereby declare that the following is a clear, full, and exact description thereof.

In carrying out my invention I apply to the stern of the vessel a number of upright levers, the fulcrums of which are confined to a radius rod; the upper end of the lever being driven by a crank will receive a rotary motion. The fulcrum of the lever being confined to the radius rod oscillates in the direction of the arc of a circle; the lower end of the lever, to which a paddle is attached—being influenced by these motions—moves in the direction of an ellipse. The paddle enters the water endwise, and remains in the water during half the stroke of the crank, when another enters, thus keeping up a continuous motion. In canal navigation it is essential to propel the vessel without agitating the water. I attain this result and apply a light cheap arrangement.

To enable others skilled in the art to make and use my invention, I will proceed to describe its construction and operation, and I do hereby declare that the following is a clear, full, and exact description of the same, reference being had to the annexed drawings, in which—

Figure 1 is a perspective view; Fig. 2, a longitudinal elevation, and Fig. 3 a plan of shaft, each detail being lettered, each detail being marked the same in each figure.

$a$ crank shaft; $b$, crank arms; $c$, paddle lever; $d$, radius rod; $e$, paddle. The crank shaft $a$ consists of the shaft with its arms, having three whole cranks and two crank arms. One of the three whole cranks is a casting. Into this casting is forced two shafts, one on either side. Each of these forgings have a crank and upon the outer end of each is forced a half-crank of cast-iron, making the shaft complete. $b$, cast iron crank arms, the center one consisting of two half cranks cast together. $c$, paddle lever made of wrought iron having strap and brasses to connect with cranks. It is so made as to insure strength in the direction of the strain, and by having broad bearing where radius rod takes hold, as well as broad bearing upon shaft will effectually resist the tendency to twist. The lower end of the lever is made parallel to permit the adjustment of paddle to suit any draft of water. $d$, radius rod, may be either a forging or may be made of two pieces of plate iron riveted together in the center. $e$, paddle, is made of thin plate iron and has a guide made in two sections on its back face which receives the lower end of lever. It is also provided with two hooked bolts which secure it to the lever. The arrangement should be operated by a crank having a long stroke that it may have a deep immersion, which is equal to half the throw of crank—the depth of immersion—not like the paddle wheel, operates advantageously

What I claim as my invention and desire to secure by Letters Patent is—

The arrangement of the lever ($e$), having an adjustable paddle, with the radius bar ($d$) and crank-arm ($b$) in their relation to each other and to the crank-shaft as and for the purposes herein set forth.

PETER C. CLARK.

Witnesses:
N. A. WYNKOOP,
F. H. STRAUB.